Patented Dec. 22, 1953

2,663,713

UNITED STATES PATENT OFFICE 2,663,713

PRODUCTION OF HYDANTOIN AND GLYCINE

Halbert C. White and Don V. Wysong, Midland, Mich., assignors to The Dow Chemical Company, Midland, Mich., a corporation of Delaware No Drawing. Application March 22, 1952,
Serial No. 278,106

11 Claims. (Cl. 260—309.5)

This invention concerns an improved method for making hydantoin. It particularly concerns a procedure for carrying out the reaction of an ammonium carbonate with an alkali metal cyanide and formaldehyde to form hydantoin. The invention also relates to the production of glycine.

It is known to react together in an aqueous medium an inorganic cyanide, ammonium carbonate or ammonium bicarbonate, and an aldehyde or ketone to form an aqueous solution of a corresponding hydantoin. Although it is known to prepare 5-substituted hydantoins by reacting together, in an aqueous medium, an ammonium carbonate, an alkali metal cyanide and an aldehyde, such as acetaldehyde or propionaldehyde, and that the 5-substituted hydantoins can be separated from the aqueous reaction medium, it has not heretofore been possible to isolate the compound, hydantoin, from the crude aqueous mixture resulting from the reaction between formaldehyde, sodium cyanide and ammonium bicarbonate.

It is also known to prepare alpha-aminocarboxylic acids by reacting together, in an aqueous medium, an alkali metal cyanide, an ammonium carbonate and an aldehyde or ketone to form an aqueous solution of a corresponding hydantoin and hydrolyzing the hydantoin in the aqueous solution in which it is formed by treating the crude aqueous reaction mixture with an alkali metal base and heating the mixture under pressure at elevated temperatures, e. g. at 130° C. or above, to form an hydrolysis mixture from which the alpha-amino-monocarboxylic acid may be recovered. Although, glycine has been prepared by reacting together, in an aqueous medium, ammonium bicarbonate, sodium cyanide and formaldehyde, and thereafter concentrating the crude reaction mixture and heating the concentrate to elevated temperatures in the presence of sodium hydroxide to hydrolyze the hydantoin and form the sodium salt of glycine which latter is separated from the hydrolysis mixture and is converted to the free amino acid, the yield of glycine product obtained is undesirably low.

It has now been found that hydantoin can readily be obtained in good yield by a procedure which involves regulating the rate at which formaldehyde is introduced into an aqueous solution of an alkali metal cyanide and an ammonium carbonate at temperatures between —10° and 30° C., and thereafter heating the solution to a reaction temperature between 50° and 120° C., preferably between 70° and 90° C., to complete the reaction. The hydantoin is separated from the reaction mixture by a procedure as is more fully described hereinafter. By introducing the formaldehyde into an aqueous solution of alkali metal cyanide and an ammonium carbonate at room temperature or below, and at a relatively slow rate, suitably at a rate corresponding to one molecular proportion of the formaldehyde per molecular equivalent proportion of the alkali metal cyanide in the solution over a period of from 4 to 6 hours, or longer, and thereafter heating the solution to a reaction temperature of 50° C. or above, to complete the reaction, the reaction proceeds smoothly and results in substantially higher yields of the hydantoin product than when the formaldehyde is added more rapidly, or all at once, to the reaction.

The hydantoin thus obtained may be hydrolyzed to form glycine, or the crude reaction mixture containing the hydantoin, together with by-product or intermediate substances and impurities of the reaction, may be mixed with an alkali metal base and the hydantoin hydrolyzed to obtain a mixture from which the glycine may be separated in any usual way.

It has further been found that by treating the crude aqueous reaction mixture comprising hydantoin and its usual impurities, prepared by the method of the invention, with an aqueous alkali metal base and heating the mixture to temperatures between 130° and 250° C., preferably from 150° to 180° C., that an aqueous mixture is obtained from which glycine of high purity can be separated, as hereinafter described, in substantially greater yield than is obtained by previously known procedures.

The formaldehyde may be used as an aqueous solution containing from 27 to 40 per cent by weight of the formaldehyde, but is preferably used in its polymeric form, i. e. as paraformaldehyde.

The alkali metal cyanide may be sodium cyanide or potassium cyanide.

Ammonium carbonate or ammonium bicarbonate may be employed as equivalents of each other and are used in amount sufficient to provide the chemical equivalent of at least 2 moles of ammonia and at least 1.5 moles of carbonate per mole of the formaldehyde or chemical equivalent proportion of paraformaldehyde used. The ammonium bicarbonate is preferably used in amount of from 2 to 2.4 moles per mole of the formaldehyde. The alkali metal cyanide is usually employed in amount corresponding to from 1 to 1.2 molecular equivalent proportions of the alkali metal cyanide per mole of the formaldehyde.

The inorganic salts, i. e. the alkali metal cyanide and an ammonium carbonate, are dissolved in water to form an aqueous solution containing from 5 to 30 per cent, preferably from 15 to 25 per cent, by weight of the total salts, based on the weight of the solution. The formaldehyde in the form of an aqueous solution, or as paraformaldehyde, is introduced into the aqueous solution of the inorganic salts at temperatures between $-10$ and $30°$ C., preferably at temperatures of from $5°$ to $20°$ C., and in amount corresponding to approximately one molecular equivalent of formaldehyde per mole of the alkali metal cyanide in the solution.

It is important that the formaldehyde be mixed with the aqueous solution of the alkali metal cyanide and an ammonium carbonate at temperatures between $-10°$ and $30°$ C., and at a slow rate in order to obtain good yields of the hydantoin product. The formaldehyde, when in low concentration in the solution, appears to react upon contact with an alkali metal cyanide and an ammonium carbonate in aqueous medium at low temperatures to form reactive intermediate substances which materials further react on heating to elevated temperatures to form hydantoin. However, when such intermediate substances are contacted with a further amount of formaldehyde at low temperature such as may occur by introducing the formaldehyde into the solution at too rapid a rate, the intermediate substances react therewith to form by-product materials which are not converted to hydantoin upon heating to elevated temperatures. Regardless of the chemical reactions which are involved in the process, it has been found that good results are obtained when the formaldehyde is introduced into an aqueous solution of an alkali metal cyanide and an ammonium carbonate in the relative proportions previously mentioned and at temperatures of from $-10°$ to $30°$ C. at a rate corresponding to not more than one molecular proportion of the formaldehyde per molecular equivalent proportion of the alkali metal cyanide in the solution over a period of about four hours, preferably six hours or longer. Best results are usually obtained by mixing paraformaldehyde with an aqueous solution of an ammonium carbonate and an alkali metal cyanide and stirring the mixture at room temperature or below until the paraformaldehyde is dissolved, then heating the solution to elevated temperatures to complete the reaction.

In practice, ammonium carbonate or ammonium bicarbonate and an alkali metal cyanide such as potassium cyanide or sodium cyanide, are dissolved in water to form an aqueous solution containing a total of from 5 to 30, preferably from 15 to 25, per cent by weight of the total salts in proportions corresponding to approximately two moles of the ammonium carbonate per mole of the alkali metal cyanide. The solution is stirred and maintained at temperatures between $-10°$ and $30°$ C. Formaldehyde, or paraformaldehyde, in amount corresponding to one molecular equivalent of formaldehyde per mole of the alkali metal cyanide in the solution is then mixed therewith. As previously mentioned, the formaldehyde, when used as an aqueous solution, is added to the solution at a rate corresponding to the addition of one molecular proportion of the formaldehyde per mole of the alkali metal cyanide in the solution over a period of about four hours or longer. When paraformaldehyde is employed in the reaction it may be added intermittently, or all at once, to the solution in the desired proportion, and the mixture stirred at low temperatures until the paraformaldehyde is dissolved. The rate at which the paraformaldehyde dissolves in the aqueous solution at temperatures between $-10°$ and $30°$ C. appears to be such that formaldehyde is caused to be released to the solution at a rate sufficiently slow to result in the formation of reactive intermediate substances which are converted to hydantoin upon heating the solution to higher temperatures, e. g. at reflux temperature, to complete the reaction.

After mixing the desired proportion of formaldehyde or paraformaldehyde with the aqueous solution of an ammonium carbonate and the alkali metal cyanide, the resulting solution is heated at temperatures between $50°$ and $120°$ C., preferably from $70°$ to $90°$ C., for a time sufficient to complete the reaction. The reaction is usually complete after heating the solution at temperatures of about $80°$ C. for a time of from 2 to 3 hours. At higher temperatures, e. g. at temperatures of from $100°$ to $120°$ C., heating for a time of from one-half to one hour is satisfactory.

The hydantoin is preferably recovered from the reaction mixture by heating the solution at atmospheric pressure until the liquid is at a temperature of $102°$ C. to distill vapors of ammonia and carbon dioxide from the liquid. The liquid is cooled, and if of undesirable color, may be treated with a decolorizing carbon such as those known to the trade as Norit, or Darco G60, and filtered. The filtrate is then treated with a cation exchange resin in hydrogen form to remove alkali metal ions from the liquid and the aqueous liquid is concentrated by evaporating a portion of the water. The concentrate is cooled to precipitate or crystallize the hydantoin.

Suitable cation exchange agents that may be used in hydrogen form to remove alkali metal ions from the reaction liquid are the insoluble sulfonated vinyl aromatic resins and sulfonated phenol-formaldehyde resins.

The hydantoin may be hydrolyzed to form glycine by heating the same with an aqueous solution of an alkali, e. g. an aqueous solution of sodium or potassium hydroxide. In a preferred embodiment, the crude reaction liquor containing hydantoin is mixed with an aqueous solution of sodium hydroxide in amount corresponding to at least two moles of the sodium hydroxide per molar equivalent of the formaldehyde starting material to form a solution preferably containing from 5 to 15 per cent by weight of the alkali metal hydroxide. The solution is then heated under pressure at temperatures between $130°$ and $250°$ C., preferably at temperatures of from $150°$ to $180°$ C. until the hydrolysis is substantially complete, suitably for a time of from 20 to 60 minutes. The hydrolysis liquor is cooled, decolorized by treatment with carbon, filtered and is heated to a temperature of $102°$ C. to remove volatile ingredients, e. g. ammonia and carbon dioxide, from the liquid. The liquor is cooled and is treated with a cation exchange resin such as a sulfonated vinyl aromatic resin, or a sulfonated phenol-formaldehyde resin, in hydrogen form, until the liquor is substantially neutral, i. e. has a pH value of from 6 to 8. The alkaline hydrolysis liquor may be neutralized by adding the same to a suitable cation exchange resin in hydrogen form and stirring the mixture, or by adding granules of the cation exchange resin in hydrogen form to the aqueous solution with stirring and in amount sufficient to absorb the alkali metal ions and bring the aqueous solution to a substantially neutral pH value. The aqueous solution is separated from the resin by filtering and is concentrated by evaporation of a portion of the water. The concentrate is mixed with methyl alcohol to precipitate or crystallize the glycine product. The latter is separated by filtering and is washed and dried. The cation exchange resin recovered in the process may be regenerated to its hydrogen form by treating the same with an aqueous solution of a strong mineral acid, e. g. an aqueous 5 weight per cent solution of hydrochloric or sulfuric acid, and after washing with water is suitable for re-use.

The following examples illustrate ways in which the principle of the invention has been applied, but are not to be construed as limiting the scope of the invention.

*Example 1*

A solution of 174 grams (2.2 moles) of ammonium bicarbonate, 51.6 grams (1.04 moles) of sodium cyanide and 800 cc. of water was placed in a glass reaction vessel equipped with a reflux condenser and stirrer. The mixture was stirred and cooled to a temperature of 18° C., and 36.2 grams of paraformaldehyde having a purity of 91 per cent was added thereto. The mixture was stirred and maintained at temperatures between 18° and 30° C. over a period of one hour to dissolve the paraformaldehyde. Thereafter, the solution was heated under reflux at temperatures between 80° and 85° C. for a time of 3 hours, then cooled. There were obtained 1000 cc. of reaction liquor. A 200 cc. portion of the reaction liquor was boiled at atmospheric pressure until the liquid reached a temperature of 102° C. The liquid was treated with Darco G60 (a decolorizing charcoal) and filtered. The filtrate was mixed with 120 grams of Dowex 50 resin, a sulfonated vinyl aromatic resin, in hydrogen form. The liquid was separated from the resin by filtering and the resin was washed with water. The combined filtrate had a pH value of 1.8. It was concentrated by evaporation of a portion of the water to leave a residue of 40 cc. of liquid. This liquid was cooled to 5° C. whereupon a crystalline product was obtained. The crystals were separated by filtering, washed with water and dried. There were obtained 8 grams of hydantoin having a melting point of 220° C. This corresponds to a yield of 40 per cent based on the paraformaldehyde initially used.

*Example 2*

A 200 cc. portion of the reaction liquor from Example 1 was mixed with 60 cc. of an aqueous solution containing 30 per cent by weight of sodium hydroxide. The solution was heated in an iron autoclave at a temperature of 170° C. for a period of one-half hour, with agitation, then cooled. The liquid was removed from the autoclave, was treated with Darco G60 to decolorize the same and filtered. The filtrate was boiled at atmospheric pressure until the liquid was at a temperature of 102° C., then cooled. 112 cc. of the liquid was stirred with 280 grams of granular Dowex 50 resin in hydrogen form. The liquid had a pH value of 6. The liquid was separated from the resin by filtering and the resin was washed with water. The combined filtrate was concentrated by evaporation of a part of the water to leave a residue of 25 cc. of liquid. The residue was diluted with 100 cc. of methyl alcohol. A crystalline product was obtained. It was separated from the liquid by filtering and was washed with methyl alcohol and dried. There were obtained 7.0 grams of glycine. This corresponds to a yield of 83.2 per cent of theoretical, based on the paraformaldehyde starting material.

*Example 3*

In each of three identical experiments, a solution of 137 pounds (1.73 moles) of ammonium bicarbonate, 42 pounds (0.86 mole) of sodium cyanide and 85 gallons of distilled water was placed in a reaction vessel equipped with a stirrer. The solution was stirred and cooled to 5° C., and 65 pounds of an aqueous 37 weight per cent formaldehyde solution gradually added thereto over a period of 6 hours while maintaining the mixture at temperatures between 4° and 6° C. Thereafter, the solution was heated under pressure at a temperature of 80° C. for a time of 2.25 hours to complete the reaction. The reaction solution was boiled at atmospheric pressure until the liquid was at a temperature of 102° C. to distill vapors of ammonia and carbon dioxide from the liquid. The liquid was cooled and mixed with 12.5 gallons of an aqueous solution containing 50 per cent by weight of sodium hydroxide. The alkaline solutions thus obtained from each of the three experiments were combined. The combined alkaline solution was pumped under pressure through a tubular reactor and heated at temperatures between 170° and 180° C. for a reaction time of 30 minutes. By reaction time is meant the time required for an infinitesimal portion of the solution to pass through the heated portion of the coil from the point of feed to the point of discharge. The cooled hydrolysis liquor was treated with Dowex 50, a sulfonated vinyl aromatic resin, in hydrogen form, to neutralize the same. The liquid had a pH of 6. The liquid was then treated with Darco G60, was separated by filtering and was concentrated by evaporation of a portion of the water to leave a liquid residue of about one-fifth its original volume. The liquid residue was mixed with methyl alcohol to crystallize the glycine product. The product was separated by filtering, was washed with methyl alcohol and dried. There were obtained 148 pounds (1.975 moles) of glycine as a light cream colored crystalline product. The yield was 82 per cent based on the formaldehyde initially used.

We claim:

1. A process for making hydantoin which comprises introducing one mole of formaldehyde into contact with an aqueous solution containing an ammonium carbonate and an alkali metal cyanide in proportions sufficient to provide the chemical equivalent of at least 2 moles of ammonia, at least 1.5 moles of carbonate and at least one mole of the alkali metal cyanide, at temperatures between $-10°$ and $30°$ C., and at a rate such that not more than one mole of the formaldehyde is released to the reaction over a period of 4 hours, then heating the solution to a reaction temperature between 50° and 120° C. to complete the reaction and separating hydantoin from the reaction liquid.

2. A process, as described in claim 1, wherein the formaldehyde is in the form of an aqueous solution containing from 27 to 40 per cent by weight of formaldehyde.

3. In a process as described in claim 1, the steps of separating the hydantoin from the reaction liquid by heating said liquid to a temperature of 102° C. at atmospheric pressure to distill vapors of ammonia and carbon dioxide from the liquid, cooling the liquid and treating the same with a cation exchange agent in hydrogen form to remove alkali metal ions from the liquid, then concentrating the liquid by evaporation of a portion of the water and cooling the remaining liquid to crystallize the hydantoin therefrom.

4. A process for making hydantoin which comprises dissolving paraformaldehyde in amount corresponding to one molecular equivalent of formaldehyde in an aqueous solution containing an ammonium carbonate and an alkali metal cyanide in proportions sufficient to provide the chemical equivalent of at least 2 moles of ammonia, at least 1.5 moles of carbonate and at least one mole of the alkali metal cyanide, at temperatures between −10° and 30° C., then heating the solution to a reaction temperature between 50° and 120° C. to complete the reaction and separating hydantoin from the reaction liquid.

5. A process for making hydantoin which comprises dissolving paraformaldehyde in amount corresponding to one molecular equivalent of formaldehyde in an aqueous solution containing ammonium bicarbonate and sodium cyanide in total amount of from 15 to 25 per cent by weight based on the weight of the solution, and in proportions corresponding to from 2 to 2.4 moles of the ammonium carbonate and from 1 to 1.2 moles of the sodium cyanide, at temperatures between 0° and 30° C., then heating the solution to a reaction temperature between 70° and 90° C. to complete the reaction and separating hydantoin from the reaction liquid.

6. A process for making glycine which comprises introducing one mole of formaldehyde into contact with an aqueous solution containing an ammonium carbonate and an alkali metal cyanide in proportions sufficient to provide the chemical equivalent of at least 2 moles of ammonia and at least 1.5 moles of carbonate and at least one mole of the alkali metal cyanide, at temperatures between −10° and 30° C., and at a rate such that not more than one mole of the formaldehyde is released into contact with the dissolved salts in the solution over a period of 4 hours, then heating the solution at temperatures between 50° and 120° C. to complete the reaction and boiling the reaction liquid to distill vapors of ammonia and carbon dioxide from the aqueous liquid, mixing the aqueous liquid with an alkali metal hydroxide in amount corresponding to at least two moles of the alkali metal hydroxide per mole of the formaldehyde starting material, heating the solution to temperatures between 130° and 250° C. to hydrolyze the hydantoin and recovering glycine from the alkaline liquid.

7. A process, as described in claim 6, wherein the formaldehyde is in the form of an aqueous solution containing from 27 to 40 per cent by weight of formaldehyde.

8. In a process as described in claim 6, the steps of separating the glycine from the hydrolysis liquid by heating said liquid to a temperature of 102° C. to distill vapors of ammonia and carbon dioxide from the liquid, treating the liquid with a cation exchange agent in hydrogen form to remove alkali metal ions from the liquid and bring the latter to a pH value between 6 and 8, then concentrating the liquid by evaporation of a portion of the water and mixing the liquid residue with methyl alcohol to crystallize the glycine.

9. A process for making glycine which comprises dissolving paraformaldehyde in amount corresponding to one molecular equivalent of formaldehyde in an aqueous solution containing an ammonium carbonate and an alkali metal cyanide in proportions sufficient to provide the chemical equivalent of at least 2 moles of ammonia and at least 1.5 moles of carbonate and at least one mole of the alkali metal cyanide, at temperatures between −10° and 30° C., then heating the solution to temperatures between 50° and 120° C. to complete the reaction to form hydantoin and boiling the reaction liquid to distill vapors of ammonia and carbon dioxide from the aqueous liquid, mixing the aqueous liquid with an alkali metal hydroxide in amount corresponding to at least two moles of the alkali metal hydroxide per molar equivalent of formaldehyde in the starting materials, heating the solution to temperatures between 150° and 180° C. to hydrolyze the hydantoin and form glycine and recovering glycine from the alkaline hydrolysis liquid.

10. A process for making glycine which comprises dissolving paraformaldehyde in amount corresponding to one molecular equivalent of formaldehyde in an aqueous solution containing ammonium bicarbonate and sodium cyanide in proportions corresponding to approximately from 2 to 2.4 moles of the ammonium bicarbonate and from 1 to 1.2 moles of the sodium cyanide in total amount of from 15 to 25 per cent by weight based on the weight of the solution, at temperatures between 0° and 30° C., then heating the solution to a reaction temperature between 70° and 90° C. to complete the reaction to form hydantoin and boiling the reaction liquid to distill vapors of ammonia and carbon dioxide from the aqueous liquid, mixing the aqueous liquid with an alkali metal hydroxide in amount sufficient to form a solution containing from 5 to 15 per cent by weight of the alkali metal hydroxide, heating the solution to temperatures between 150° and 180° C. to hydrolyze the hydantoin and form glycine and recovering glycine from the alkaline hydrolysis liquid.

11. In a process for making hydantoin, the steps which consist in introducing one mole of formaldehyde into contact with an aqueous solution containing an ammonium carbonate and an alkali metal cyanide in proportions sufficient to provide the chemical equivalent of at least 2 moles of ammonia, at least 1.5 moles of carbonate and at least one mole of the alkali metal cyanide, at temperatures between −10° and 30° C., and at a rate such that not more than one mole of the formaldehyde is released to the reaction over a period of 4 hours, then heating the solution to a reaction temperature between 50° and 120° C. to complete the reaction.

HALBERT C. WHITE.
DON V. WYSONG.

References Cited in the file of this patent

UNITED STATES PATENTS

| Number | Name | Date |
|---|---|---|
| 2,480,644 | Goldsmith et al. | Aug. 30, 1949 |
| 2,527,366 | Livak et al. | Oct. 24, 1950 |
| 2,557,920 | White | June 19, 1951 |